United States Patent
Hoffer et al.

(10) Patent No.: US 12,140,506 B2
(45) Date of Patent: Nov. 12, 2024

(54) METHOD FOR DETECTING AND PREVENTING LEAKS

(71) Applicants: OMV Downstream GmbH, Vienna (AT); INWA AG, Rüthi (CH)

(72) Inventors: Ronald Jürgen Hoffer, Oberwart (AT); Thomas Pfaffl, Münichsthal (AT); Christian Steinbrugger, Vienna (AT); Jürgen Hörburger, Rüthi (CH); Robert Kahr, Graz (AT)

(73) Assignees: OMV DOWNSTREAM GMBH, Vienna (AT); INWA AG, Rüthi (CH)

( * ) Notice: Subject to any disclaimer, the term of this patent is extended or adjusted under 35 U.S.C. 154(b) by 567 days.

(21) Appl. No.: 17/416,802

(22) PCT Filed: Dec. 20, 2019

(86) PCT No.: PCT/EP2019/086638
§ 371 (c)(1),
(2) Date: Jun. 21, 2021

(87) PCT Pub. No.: WO2020/127947
PCT Pub. Date: Jun. 25, 2020

(65) Prior Publication Data
US 2022/0065734 A1  Mar. 3, 2022

(30) Foreign Application Priority Data
Dec. 20, 2018  (EP) ..................................... 18214779

(51) Int. Cl.
*G01M 3/32* (2006.01)
*B65D 90/24* (2006.01)
(Continued)

(52) U.S. Cl.
CPC ........... *G01M 3/3272* (2013.01); *B65D 90/24* (2013.01); *B65D 90/50* (2013.01); *F17C 3/00* (2013.01);
(Continued)

(58) Field of Classification Search
CPC ...... B65D 90/505; G01M 3/32; G01M 3/3226
See application file for complete search history.

(56) References Cited

U.S. PATENT DOCUMENTS

| 3,339,415 A | 9/1967 | Wild |
| 4,450,711 A * | 5/1984 | Claude .................. G01M 3/283 73/40.7 |

(Continued)

FOREIGN PATENT DOCUMENTS

| CN | 203259311 | 10/2013 |
| CN | 108956039 A | 12/2018 |

(Continued)

OTHER PUBLICATIONS

Indian Office Action dated Mar. 9, 2022 issued in Indian Patent Application No. 202117023550 and English translation, 8 pp.
(Continued)

*Primary Examiner* — Bernarr E Gregory
(74) *Attorney, Agent, or Firm* — NIXON & VANDERHYE P.C.

(57) ABSTRACT

A method for detecting and preventing leaks of a double-walled container for the storage of poisonous, caustic, irritant and/or combustible media utilizes a double-walled container with an inner wall and an outer wall. A cavity is formed between the inner wall and the outer wall, a positive pressure is generated in the cavity, and in the event of a leak of the inner wall, a gas is fed to the cavity in order to maintain a positive pressure in the cavity. A container system includes an open-loop/closed-loop control device for the
(Continued)

open-loop/closed-loop control of a gas throughflow in a line. The system includes a pressure measuring unit for measuring the pressure in the cavity of the double-walled container.

23 Claims, 1 Drawing Sheet

(51) Int. Cl.
    *B65D 90/50*     (2019.01)
    *F17C 3/00*     (2006.01)
    *F17C 3/02*     (2006.01)
    *F17C 13/02*     (2006.01)
    *G08B 21/18*     (2006.01)

(52) U.S. Cl.
    CPC ......... *F17C 13/026* (2013.01); *G01M 3/3245* (2013.01); *G08B 21/182* (2013.01); *F17C 2203/0629* (2013.01); *F17C 2250/036* (2013.01); *F17C 2250/0417* (2013.01); *F17C 2250/0439* (2013.01); *F17C 2260/036* (2013.01); *F17C 2260/038* (2013.01)

(56) References Cited

U.S. PATENT DOCUMENTS

| | | | | |
|---|---|---|---|---|
| 5,117,677 | A * | 6/1992 | Hendershot | G01M 3/32 |
| | | | | 340/605 |
| 5,752,616 | A * | 5/1998 | Watkinson | B65D 90/505 |
| | | | | 220/62.2 |
| 2005/0087258 | A1 | 4/2005 | Knight | |
| 2007/0221673 | A1 | 9/2007 | Nagler et al. | |
| 2011/0210857 | A1 | 9/2011 | Berg et al. | |
| 2012/0136579 | A1* | 5/2012 | Kvernvold | G01M 3/283 |
| | | | | 702/12 |

FOREIGN PATENT DOCUMENTS

| | | | |
|---|---|---|---|
| DE | 497563 | 5/1930 | |
| DE | 24 12 373 | 9/1975 | |
| DE | 3739453 A1 * | 5/1989 | ........... B65D 90/505 |
| DE | 3933265 A1 * | 5/1991 | ........... G01M 3/3226 |
| DE | 4135200 | 4/1993 | |
| DE | 68912766 T2 | 5/1994 | |
| DE | 4320986 | 1/1995 | |
| DE | 10062089 C1 * | 12/2001 | ........... G01M 3/283 |
| EP | 1179505 | 2/2002 | |
| RU | 2602417 | 11/2016 | |
| WO | WO2009/132365 A2 * | 11/2009 | ............. G01M 3/32 |
| WO | WO 2016/037201 | 3/2016 | |

OTHER PUBLICATIONS

International Search Report dated Apr. 1, 2020 issued in PCT International Patent Application No. PCT/EP2019/086638, 9 pp.
Extended European Search Report dated Aug. 28, 2019 issued in European Patent Application No. 18214779.3 and English translation, 16 pp.
Russian Office Action dated Feb. 28, 2022 issued in Russian Patent Application No. 2021120088 and English translation, 18 pp.
Kontejner-Reserwuar Polietilenowyj Dlja Khranenija Agressiwnykh Zhidkostej. Opisanije I Kharakteristiki, Moscow, 2007, Item 2.4, 2.5.2, Section 2. Technical data, (http://docplayer.com/34228567-Konteyner-rezeryuar-polietilenoyyy-dlya-hraneniya-agressivnyh-zhidkostey.html), website pages, printed out on Mar. 30, 2022, 14 pp.
Chinese Office Action dated Dec. 20, 2023 issued in Chinese Patent Application No. 201980084773.3 and English translation, 22 pp.
Chinese Office Action dated Jun. 28, 2024 issued in Chinese Patent Application No. 20198008477313 and English translation, 20 pp.

* cited by examiner

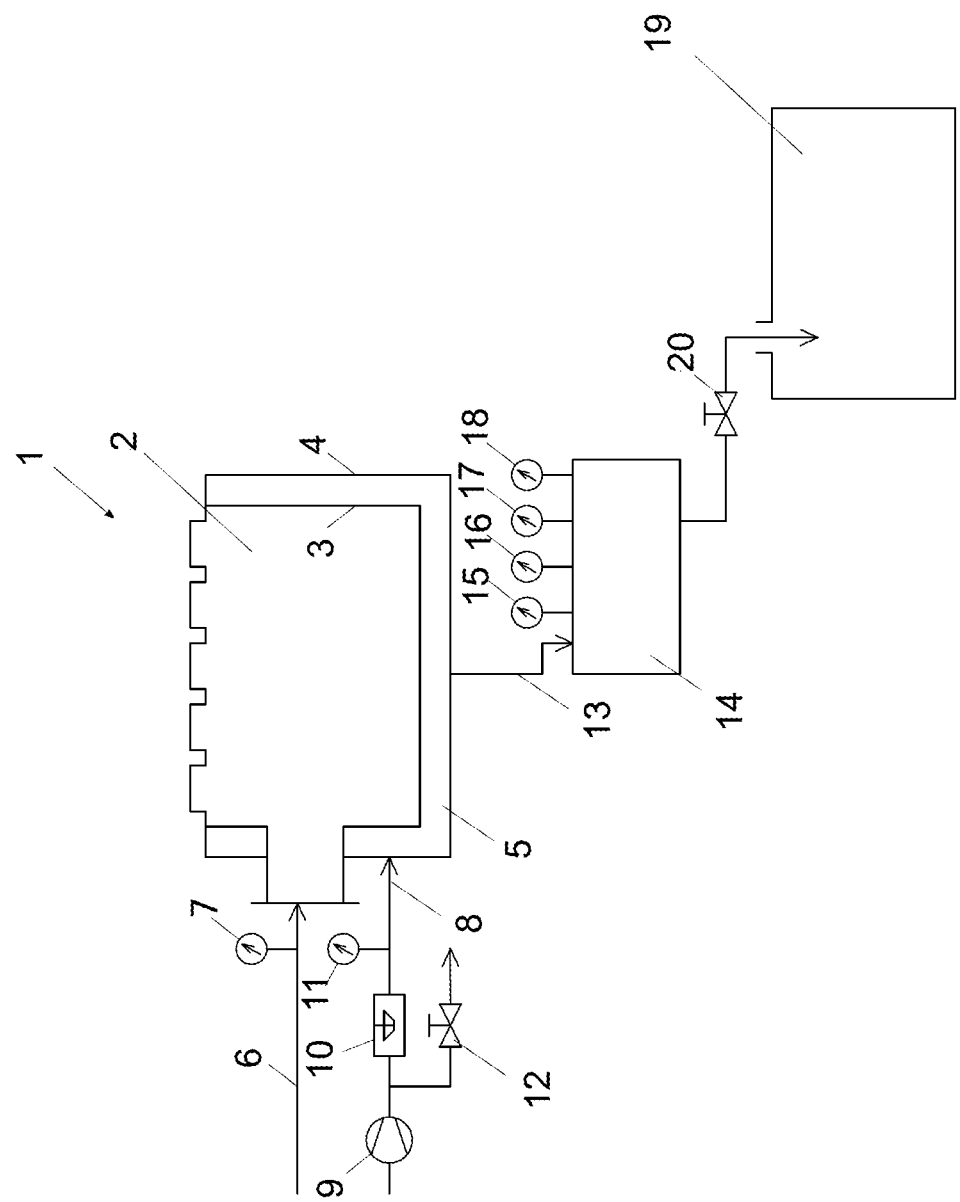

METHOD FOR DETECTING AND PREVENTING LEAKS

This application is the U.S. national phase of International Application No. PCT/EP2019/086638 filed Dec. 20, 2019 which designated the U.S. and claims priority to European Patent Application No. 18214779.3 filed Dec. 20, 2018, the entire contents of each of which are hereby incorporated by reference.

The invention pertains to a method for detecting and preventing leaks in a double-walled container for the storage of poisonous, caustic, irritant and/or combustible media, as well as to a corresponding container system.

Double-walled containers have an inner and an outer wall and are used, in particular, for reducing the probability of an escape of the media stored therein. The advantage in comparison with containers that have only one wall can be seen in that the outer wall prevents the stored medium from escaping in case the inner wall springs a leak. The storage of poisonous, caustic, irritant and/or combustible media, which cannot be released into the environment, is particularly relevant in this context. The storage of caustic media in containers represents a particular challenge because this type of media attacks the walls of the container, in which they are stored, and therefore can cause leaks. Devices for detecting leaks proved successful in preventing the destruction of the inner and the outer wall of containers used for the storage of caustic media. These devices detect a leak in the inner wall and send a signal to the operator of the system comprising the container such that the operator can react to the leak in the inner container wall and prevent an escape of the medium from the container.

A double-walled container of this type is known, for example, from EP 1 179 505 A1. This publication discloses a device for the storage of liquids that comprises a double-walled container, an outlet in the form of a double-walled pipeline arranged at the lowest point of the container, as well as two shut-off devices that are connected by a connecting element. The double-walled container, the double-walled pipeline and the two shut-off devices respectively have a monitoring space, wherein the monitoring spaces are connected to one another in order to prevent an uncontrolled escape of a liquid stored in the container. The common monitoring space is monitored with a pressure-based leak indicator, which in the case of a leak sends a signal to an annunciator. This device has the disadvantage that this type of leak detection only works for liquids, but not for gases. Another disadvantage can be seen in that the liquid accumulates in the monitoring spaces of the container, the pipeline and the shut-off devices in case of a leak.

DE 41 35 200 A discloses a leak indicator for double-walled containers, double-walled pipes and the like, which are used for storing and transporting water-polluting liquids. The leak indicator comprises a pressurized monitoring space of the container or the pipe, which is formed by an inner jacket and an outer jacket. A pressure drop in the monitoring space, which is during normal operation caused by natural leakiness of the leak indicator and the supply line, is compensated within a defined control range by refilling compressed gas from a compressed gas reservoir after opening the solenoid valve via the throttle device in the supply line by means of the refill pressure switch.

US 2012/136579 A1 discloses a method for determining and quantifying a leak between a first and a second pipe, wherein the first pipe is at least partially surrounded by the second pipe. A measuring arrangement comprising a flow meter and a pressure gauge makes it possible to produce a constant pressure differential between the pipes in case of a leak in the first pipe.

DE 43 20 986 A1 describes a different type of conveyor line and a method for monitoring a conveyor line, wherein this conveyor line is realized in a double-walled manner.

Furthermore, US 2007/221673 A1 discloses a storage container for water-polluting liquids with a leak detection and retention system that comprises a channel, which surrounds a tank directly adjacent to the outer wall of the tank and serves for collecting escaping liquid, a channel drain, a liquid collection container and a detection system for the water-polluting liquids. The channel drain is suitable for conveying liquid collected in the channel into the liquid collection container, which is equipped with the detection system.

US 2005/087258 A1 discloses a fuel nozzle of a refueling system that has a PFA coating.

CN 203 259 311 U discloses a leakage measuring device of a desulfurization gas-gas heat exchanger system comprising a sampling tube. Samples of a waste gas of the gas-gas heat exchanger are taken with the aid of the leakage measuring device in order to detect leaks in the heat exchanger.

The present invention is based on the objective of respectively mitigating or eliminating at least individual disadvantages of the prior art. The invention particularly aims to disclose a method for reliably detecting and preventing leaks in a double-walled container.

The present invention makes available a method for detecting and preventing leaks in a double-walled container, wherein the double-walled container has an inner wall and an outer wall, wherein a cavity is formed between the inner wall and the outer wall, wherein a positive pressure is generated in the cavity, and wherein a gas is fed to the cavity in the case of a leak in the inner wall in order to maintain a positive pressure in the cavity.

The above-defined objective is thereby attained.

The invention accordingly also makes available a container system for the storage of poisonous, caustic, irritant and/or combustible media. This container system at least comprises:
  a double-walled container having an inner wall and an outer wall, wherein a cavity is formed between the inner wall and the outer wall;
  a compressor, preferably a side channel blower;
  a line that is provided for conveying a gas and serves for connecting the outer wall to the compressor;
  an open-loop/closed-loop control device, preferably a control valve, particularly a bypass control valve, for the open-loop/closed loop control of a gas throughflow in the line; and
  a pressure measuring unit for measuring the pressure in the cavity of the double-walled container.

The above-defined objective is thereby also attained.

In the inventive method, the medium located in the interior of the double-walled container surprisingly does not escape from the container if the inner wall springs a leak because the absolute pressure in the cavity between the inner wall and the outer wall of the container, which is greater than the absolute pressure in the container, causes a flow from the cavity into the interior of the container through the leak in the inner wall. The interior of the container is the volume enclosed by the container, wherein the container may be at least partially open on top or completely closed.

The inventive container system comprises a double-walled container that has an inner wall and an outer wall, wherein a cavity is formed between the inner wall and the outer wall. The container system furthermore comprises a compressor, preferably a side channel blower, for generating a positive pressure, wherein said compressor is connected to the outer wall of the double-walled container via a line provided for conveying a gas. The pressure in the cavity of the container is measured with the aid of a pressure measuring unit and an open-loop or closed-loop control of a gas throughflow in the line is realized by means of an open-loop/closed-loop control device. If the positive pressure in the cavity of the container drops due to a leak, the dropping pressure is measured by the pressure measuring unit and the pressure signal is transmitted to the open-loop/closed-loop control device. The open-loop/closed-loop control device, which preferably is a control valve, particularly a bypass control valve, subsequently controls the gas flow rate in the line in order to convey gas into the cavity in a controlled manner and to thereby maintain the positive pressure in the cavity.

According to a preferred embodiment, the double-walled container is supplied with at least one gas, preferably at least one gas and at least one liquid. If the inner wall of the container springs a leak, the gas is advantageously prevented from escaping from the container due to the higher pressure in the cavity between the inner wall and the outer wall relative to the pressure of the gas in the container.

According to another preferred embodiment, the positive pressure in the cavity is measured, preferably by measuring the pressure of the gas being supplied to the double-walled container and measuring the pressure of the gas being supplied to the cavity, as well as calculating the difference between these two pressures. Due to the determination of the differential pressure between the gas being supplied to the double-walled container and the gas being supplied to the cavity, the positive pressure refers to the pressure in the container and therefore ensures a higher pressure in the cavity than in the container. If the inner wall springs a leak, the flow direction through the leak consequently always extends from the cavity to the interior of the container such that the gas stored in the container is prevented from escaping from the container.

In order to control the positive pressure in the cavity, it is advantageous to control the pressure and/or the throughflow of the gas being supplied to the cavity in such a way that the positive pressure in the cavity relative to the pressure in the interior of the double-walled container lies between 5 mbar and 50 mbar, preferably between 10 mbar and 30 mbar.

According to a preferred embodiment, a liquid stored in the double-walled container, which escapes from this container due to a leak in the inner wall and accumulates in the cavity, is conveyed into a monitoring container via a drainage line at the lowest point of the cavity, wherein the monitoring container is partially filled with another liquid, preferably water, particularly fully desalinated water or softened industrial water. Consequently, the monitoring container is connected to the lowest point of the cavity of the double-walled container via a line provided for conveying a liquid. In this way, a liquid that is stored in the container and escapes from this container through a leak in the inner wall is prevented from accumulating in the cavity such that an escape of the liquid through the outer wall is prevented.

The filling level and/or the temperature and/or the conductivity of the liquid in the monitoring container is advantageously measured in order to detect leaks in the double-walled container. To this end, it is advantageous if the monitoring container has a measuring device, particularly a radar measuring device, for measuring the filling level of the liquid in the monitoring container. It is furthermore advantageous if the monitoring container has a conductivity sensor and/or a temperature sensor, wherein a multi-parameter transmitter for evaluating the measurement of the conductivity and/or the temperature of the liquid in the monitoring container preferably is provided. This has the advantage that multiple parameters such as conductivity and temperature can be simultaneously acquired and monitored with the multi-parameter transmitter in order to take into account dependencies of the parameters. One such example is the temperature dependency of the conductivity.

If liquid stored in the container escapes from this container, it is conveyed into the monitoring container, which is partially filled with another liquid, via the drainage line such that the filling level of the liquid in the monitoring container rises. Consequently, a leak in the double-walled container can be detected in the monitoring container with the aid of the measuring device, particularly the radar measuring device, for measuring the filling level of the liquid in the monitoring container. The liquid stored in the monitoring container has the advantage that the escape of a liquid, which is stored in the double-walled container and has a high temperature, causes the cooler liquid stored in the monitoring container to intermix with the warmer liquid escaping from the double-walled container in the monitoring container such that the liquid mixture has a lower temperature than the liquid escaping from the double-walled container. Any measuring devices in the monitoring container are thereby protected from overheating.

If the temperatures of the liquid stored in the container and the liquid stored in the monitoring container differ, the temperature change of the liquid in the monitoring container can be measured with the aid of the temperature sensor and a leak in the double-walled container can be detected based on this temperature change. The liquid conveyed from the cavity of the double-walled container into the monitoring container mixes with the liquid that was originally stored in the monitoring container. This intermixing of the two liquids results in an average temperature of the liquid mixture being formed, wherein said average temperature differs from the temperature of the liquid, with which the monitoring container originally was partially filled. This temperature change allows the detection of a leak in the double-walled container. If the inner wall springs a larger leak, the temperature in the monitoring container can be additionally controlled with the aid of the temperature measurement and cooling of the monitoring container.

If the conductivities of the liquid stored in the container and the liquid stored in the monitoring container differ, the conductivity change of the liquid in the monitoring container can be measured with the aid of the conductivity sensor and a leak in the double-walled container can likewise be detected based on this conductivity change. The conductivity of the liquid stored in the monitoring container changes due to the additional supply of the liquid conveyed from the cavity of the double-walled container into the monitoring container. This conductivity change allows the detection of a leak in the double-walled container.

According to a preferred embodiment, an alarm is triggered upon reaching a predefined limiting value of the filling level and/or the temperature and/or the conductivity of the liquid in the monitoring container. When the alarm is triggered, the operator of the double-walled container is informed of a leak in the inner wall of the container such that measures required in response to a leak in the inner wall can be taken in a timely manner.

In order to prevent the monitoring container from overflowing, it is advantageous to empty the monitoring container into another container, preferably an Intermediate Bulk Container (IBC), via a bottom drainage valve once the filling level of the liquid in the monitoring container reaches a limiting value. This has the advantage that liquid escaping from the double-walled container does not come in contact with the environment.

According to a preferred embodiment, the inventive container system comprises a flow meter for measuring the flow rate of the gas being supplied to the cavity of the double-walled container. In the case of a leak, the throughflow of the gas in the line from the compressor to the cavity increases due to the open-loop/closed-loop control of the gas throughflow with the aid of the open-loop/closed-loop control device, preferably by at least partially closing a control valve, particularly a bypass control valve, such that the flow rate change can be measured with the aid of the flow meter and a leak in the double-walled container can be detected based on this change.

In order to protect the double-walled container from caustic media stored therein, the inner wall and the outer wall are lined with a barrier layer, which preferably consists of a perfluoroalkoxy polymer (PFA). This lining of the container walls prevents the container from springing a leak due to caustic media located in the container, e.g. strong acids or bases.

According to a preferred embodiment, the double-walled container of the container system is used as an acid condenser trough in a desulfurization process, preferably a Wet-Sulfuric-Acid (WSA) process. Since the sulfuric acid is stored in the acid condenser trough, an escape of the sulfuric acid into the environment due to a leak has to be prevented. The inventive container system prevents these types of leaks, which are caused by caustic media such as sulfuric acid, and detects leaks in the inner wall of the double-walled container in order to prevent a leak in the outer wall and consequently an escape of the sulfuric acid from the double-walled container.

The invention is described in greater detail below with reference to the nonrestrictive exemplary embodiment illustrated in the drawing.

FIG. 1 shows a flow chart of an inventive container system, in which leaks in a double-walled container are detected and prevented.

FIG. 1 shows a flow chart of an inventive container system 1 that comprises a double-walled container 2. According to the embodiment shown, the double-wailed container 2 is used as an acid condenser trough in a Wet-Sulfuric-Acid (WSA) process. Sulfuric acid is produced in pipes, which are primarily aligned vertically and arranged in the acid condenser trough, with the aid of the WSA process known, for example, from DE 689 12 766 T2, in which sulfuric acid vapors condense and droplets of the sulfuric acid are collected in a special filter. In this case, gas containing sulfuric acid is supplied to the pipes from below at a temperature above the sulfuric acid dew point and cooled to a temperature, at which sulfuric acid condenses, while it flows upward in the pipes. Aerosol filters for separating the condensed sulfuric acid are fastened on the upper end of the pipes.

In the embodiment shown, the double-walled container 2 is a closed container that has an inner wall 3 and an outer wall 4, wherein a cavity 5 is formed between the inner wall 3 and the outer wall 4. The inner wall 3 and the outer wall 4 are lined with a barrier layer of a perfluoroalkoxy polymer (PFA) in order to increase the resistance to the liquid stored in the container 2, which at least partially consists of sulfuric acid.

In the embodiment shown, sulfur-containing waste gas is conveyed into the interior of the closed double-walled container 2 via a supply line 6 in order to condense sulfuric acid vapors in the container 2. A pressure measuring unit 7 measures the pressure of the supply line 6, wherein this pressure corresponds to the pressure in the interior of the container 2. Gas is supplied to the cavity 5 via a line 8 that is connected to the cavity 5 of the container 2. This gas is subjected to a positive pressure with the aid of a compressor, which is realized in the form of a side channel blower 9 and connected to the line 8. In addition, a flow meter 10 for measuring the flow rate and a pressure measuring unit 11 for measuring the pressure in the line 8 are arranged on the line 8. A differential pressure between the interior of the closed container 2 and the cavity 5 is determined with the aid of the pressure measurement in the supply line 6 by means of the pressure measuring unit 7 and the pressure measurement in the line 8 by means of the pressure measuring unit 11, wherein the signal of the determined differential pressure is transmitted to an open-loop/closed-loop control device, which is realized in the form of a bypass control valve 12 in the embodiment shown. During normal operation, a constant positive pressure of 20 mbar relative to the pressure in the interior of the container 2 is generated in the cavity 5 of the container 2 by means of the side channel blower 9 and the pressure control with the aid of the bypass control valve 12. The side channel blower 9 is also deactivated if no positive pressure relative to the surroundings exists in the interior of the container 2, e.g. when no sulfur-containing waste gas is supplied.

If the inner wall 3 springs a leak, gas flows from the cavity 5 into the interior of the container 2 such that the positive pressure in the cavity 5 drops. This causes the flow rate of the gas in the line 8 to increase, wherein this increase is detected with the aid of the flow meter 10 and an alarm is triggered. The pressure simultaneously drops in the line 8, wherein the bypass control valve 12 compensates this pressure drop.

In the embodiment shown, the double-walled container 2 has a drainage line 13 of polytetrafluoroethylene (PTFE) at the lowest point of the cavity 5. This drainage line 13 is connected to a monitoring container 14, which is filled to approximately 70%, with softened industrial water. The monitoring container 14 has a radar measuring device 15 for measuring the filling level of the liquid stored in the monitoring container 14. In addition to the radar measuring device 15, the monitoring container 14 also has a filling level limit indicator 16 for triggering an alarm once a limiting value of the filling level is reached. The monitoring container 14 in the embodiment shown furthermore has a conductivity sensor 17 and a temperature sensor 18 for respectively measuring the conductivity and the temperature of the liquid stored in the monitoring container 14. In order to ensure a reliable operation of the conductivity measurement, the last portion of the conductivity sensor 17, which is realized in the form of a probe in the embodiment shown, always has to be immersed in the liquid. The evaluation of the conductivity measurement and the temperature measurement is realized by means of a multi-parameter transmitter, which is not illustrated in FIG. 1.

If the inner wall 3 springs a leak in the embodiment shown, the liquid stored in the container 2, which at least partially consists of sulfuric acid, escapes through the leak and collects in the cavity 5, wherein the liquid flows to the lowest point of the cavity 5 under the influence of the gravitational force. The liquid is at the lowest point conveyed into the monitoring container 14 via the drainage line 13, wherein the liquid intermixes with the softened industrial water stored in the monitoring container 14. Due to constant wall cooling of the monitoring container 14, the temperature of the softened industrial water stored therein amounts to approximately 30° C. Since the softened industrial water intermixes with the warmer liquid from the container 2 being conveyed into the monitoring container 14, the temperature of the liquid mixture in the monitoring container 14 increases. This temperature increase is measured with the aid of the temperature sensor 18 and a corresponding signal is transmitted to the multi-parameter transmitter. The multi-parameter transmitter evaluates the signal of the temperature increase and triggers an alarm once the temperature of the liquid in the monitoring container 14 reaches 50° C.

Intermixing of the softened industrial water with the liquid from the container 2 not only causes the temperature of the liquid mixture to change, but also its conductivity. This conductivity change is measured with the aid of the conductivity sensor 17 and a corresponding signal is transmitted to the multi-parameter transmitter. The multi-parameter transmitter evaluates the signal of the conductivity increase and likewise triggers an alarm.

The liquid being conveyed into the monitoring container 14 causes the filling level of the liquid mixture stored in the monitoring container 14 to rise, wherein the rise of the filling level is measured by the radar measuring device 15 and a corresponding signal is transmitted to a device for evaluating the measurement. The rise of the filling level makes it possible to detect a leak in the inner wall 3 of the container 2 such that measures required in response to a leak in the inner wall 3 can be taken in a timely manner. The filling level limit indicator 16 triggers an alarm once the filling level of the liquid amounts to approximately 90% of the height of the internal volume of the monitoring container 14. When the alarm is triggered, the monitoring container 14 is emptied into an intermediate Bulk Container (IBC) 19 arranged underneath the monitoring container 14 via a bottom drainage valve 20 in order to prevent the liquid escaping from the container 2, which is conveyed into the monitoring container 14, from coming in contact with the environment.

The invention claimed is:

1. A method for detecting and preventing leaks in a double-walled container for the storage of poisonous, caustic, irritant and/or combustible media, wherein the double-walled container has an inner wall and an outer wall, wherein a cavity is formed between the inner wall and the outer wall, wherein a positive pressure is generated in the cavity, and wherein a gas is supplied to the cavity if the inner wall springs a leak in order to maintain a positive pressure in the cavity, wherein the positive pressure in the cavity is measured and the pressure and/or the throughflow of the gas being supplied to the cavity is controlled in such a way that the positive pressure in the cavity relative to the pressure in the interior of the double-walled container lies between 5 mbar and 50 mbar, wherein a liquid stored in the double-walled container, which escapes from this container due to a leak in the inner wall and accumulates in the cavity, is conveyed into a monitoring container via a drainage line at the lowest point of the cavity, wherein the monitoring container is partially filled with another liquid.

2. The method according to claim 1, wherein at least one gas is supplied to the container.

3. The method according to claim 2, wherein the positive pressure in the cavity is measured.

4. The method according to claim 3, wherein the positive pressure in the cavity is measured by measuring the pressure of the gas being supplied to the double-walled container and measuring the pressure of the gas being supplied to the cavity, as well as calculating the difference between these two pressures.

5. The method according to claim 1, wherein the pressure and/or the throughflow of the gas being supplied to the cavity is controlled in such a way that the positive pressure in the cavity relative to the pressure in the interior of the double-walled container lies between 10 mbar and 30 mbar.

6. The method according to claim 1, wherein the filling level and/or the temperature and/or the conductivity of the liquid in the monitoring container is measured in order to detect leaks in the double-walled container.

7. The method according to claim 1, wherein an alarm is triggered once a predefined limiting value of the filling level and/or the temperature and/or the conductivity of the liquid in the monitoring container is reached.

8. The method according to claim 1, wherein the monitoring container is emptied into another container via a bottom drainage valve once the filling level of the liquid in the monitoring container reaches a limiting value.

9. The method according to claim 8, wherein the monitoring container is emptied into an Intermediate Bulk Container (IBC).

10. The method according to claim 1, wherein at least one gas and at least one liquid is supplied to the container.

11. The method according to claim 1, wherein the monitoring container is partially filled with water.

12. The method according to claim 11, wherein the water is fully desalinated water or industrially softened water.

13. A container system for the storage of poisonous, caustic, irritant and/or combustible media used as an acid condenser trough in a desulfurization process, the container system comprising:
a double-walled container having an inner wall and an outer wall, wherein a cavity is formed between the inner wall and the outer wall; wherein it comprises the following:
a compressor;
a line that is provided for conveying a gas and serves for connecting the outer wall to the compressor;
an open-loop/closed-loop control device for the open-loop/closed-loop control of a gas throughflow in the line in such a way that the positive pressure in the cavity relative to the pressure in the interior of the double-walled container lies between 5 mbar and 50 mbar; and
a pressure measuring unit for measuring the pressure in the cavity of the double-walled container.

14. The container system according to claim 13, wherein a monitoring container is connected to the lowest point of the cavity of the double-walled container.

15. The container system according to claim 13, wherein a flow meter for measuring the flow rate of the gas is supplied to the cavity of the double-walled container.

16. The container system according to claim 13, wherein the monitoring container has a measuring device for measuring the filling level.

17. The container system according to claim 16, wherein the measuring device is a radar measuring device.

18. The container system according to claim 13, wherein the monitoring container has a conductivity sensor and/or a temperature sensor, wherein a multi-parameter transmitter is provided for evaluating the measurement of the conductivity and/or the temperature.

19. The container system according to claim 13, wherein the inner wall and the outer wall of the double-walled container are lined with a barrier layer.

20. The container system according to claim 19, wherein the barrier layer consists of a perfluoroalkoxy polymer (PFA).

21. The container system according to claim 13, wherein the open-loop/closed-loop control device is a control valve.

22. The container system according to claim 21, wherein the control valve is a bypass control valve.

23. The container system according to claim 13, wherein the desulfurization process is a Wet-Sulfuric-Acid (WSA) process.

* * * * *